UNITED STATES PATENT OFFICE.

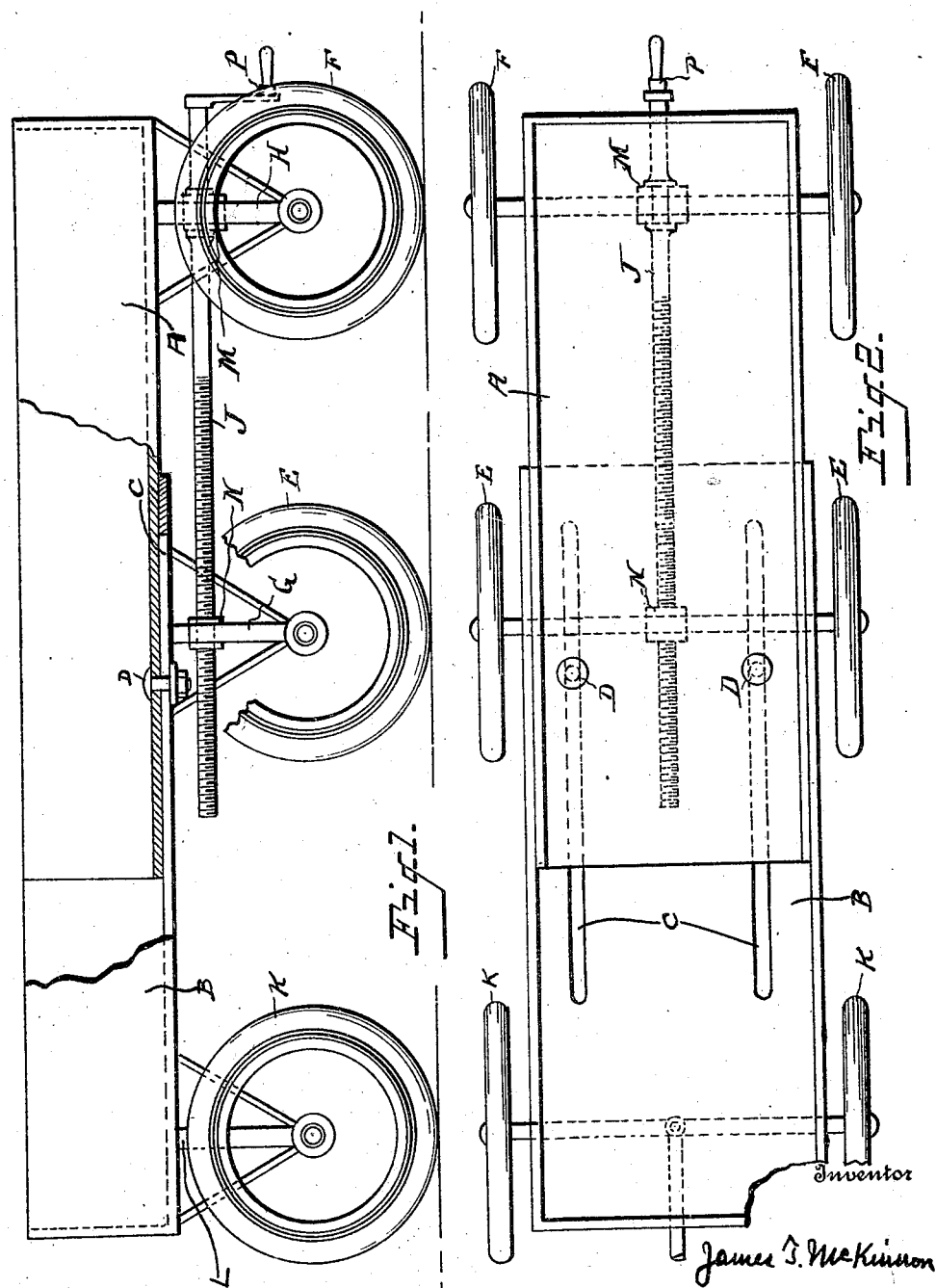

JAMES T. McKINNON, OF DETROIT, MICHIGAN.

EXTENSIBLE TRUCK BODY.

1,419,160.   Specification of Letters Patent.   Patented June 13, 1922.

Application filed June 25, 1919. Serial No. 306,522.

*To all whom it may concern:*

Be it known that I, JAMES T. MCKINNON, a citizen of the United States, residing at Detroit, county of Wayne, State of Michigan, have invented a certain new and useful Improvement in Extensible Truck Bodies, and declare the following to be a full, clear, and exact description of the same, such as will enable others skilled in the art to which it pertains to make and use the same, reference being had to the accompanying drawings, which form a part of this specification.

This invention relates to extensible trucks and truck bodies, and has for its object an improved arrangement of parts by which the length of a truck may be easily varied according to the dimensions and character of the load that is to be carried. While primarily designed for special adaptation to field ambulance work, the same principles of construction and operation would prevail as to a commercial vehicle used for transporting lumber, bars, pipe, etc., of varying lengths.

In the drawings:

Figure 1 is a side elevation of my improved construction, with certain parts shown in section.

Figure 2 is a plan view.

A and B represent telescoping or nesting sections of a wagon box, the bottom of which, as B, is provided with lengthwise slots or kerfs C, in which slidably engage studs or posts D, which are complementarily located in the bottom of the box section A. This latter is supported upon pairs of traction wheels, K and E, whose axles are secured to the bottom of the box body by means of struts or braces L and G. A similar set of traction wheels, F, is provided for the box section A, being connected therewith by the strut H.

Engaging lengthwise of the vehicle, underneath the box section B, is a screw shaft J, which is rotatably journaled within the box M in the strut H, in a way to afford lengthwise thrust (or pull) upon the strut G, which is connected with the box section A, the corresponding portion of its strut G being screw-threaded, as at N, for the engagement of the shaft J therethrough. When the shaft J is rotated in either direction by means of the handle P, the action of the shaft upon these parts, connected as they are with the box sections A and B, serves to move them lengthwise relatively to one another, thus lengthening or shortening the box body as a whole to the degree required, the guide studs D in the section A sliding along the correspondingly positioned slots C in the section B. The lengthwise throw of the shaft J due to even a whole single rotation being very slight relatively to the length of the vehicle box as a whole, the shaft also serves as a locking or holding means when the proper degree of projection or retraction of the box sections relatively to one another has been attained; this is especially true if the handle P is removed from the shaft after the desired positioning has been effected, or if the handle is held against swinging, as by a sling.

This construction makes it possible to exactly fit the length of the box body to the length or character of the articles composing the load of the vehicle at any time. It is equally adaptable to either a self-propelled vehicle or a drawn vehicle; and for light loads it is obvious that the third set of wheels K could be omitted, since the same projecting and retracting effect of the screw J upon the other two sets of wheel struts would be present.

What I claim is:

In an extensible truck body, the combination with a plurality of pairs of traction wheels, of a pair of telescoping box portions with one or the other of which each of said pairs of traction wheels is connected, headed bolt members carried by the floor of one of said box portions in position to move in longitudinally disposed slots in the floor of the other box portion as the same are moved toward or away from one another, and an actuating screw shaft operatively engaging each of said box portions, whereby the direction and extent of their movement relatively to one another may be positively controlled.

In testimony whereof, I sign this specification in the presence of two witnesses.

JAMES T. McKINNON.

Witnesses:
 WILLIAM M. SWAN,
 HARRY L. WAGNER.